W. O. REW.
MACHINE FOR FORMING AND WRAPPING SMALL PACKAGES OF BUTTER.
APPLICATION FILED FEB. 18, 1920.
1,384,921.
Patented July 19, 1921.
15 SHEETS—SHEET 1.
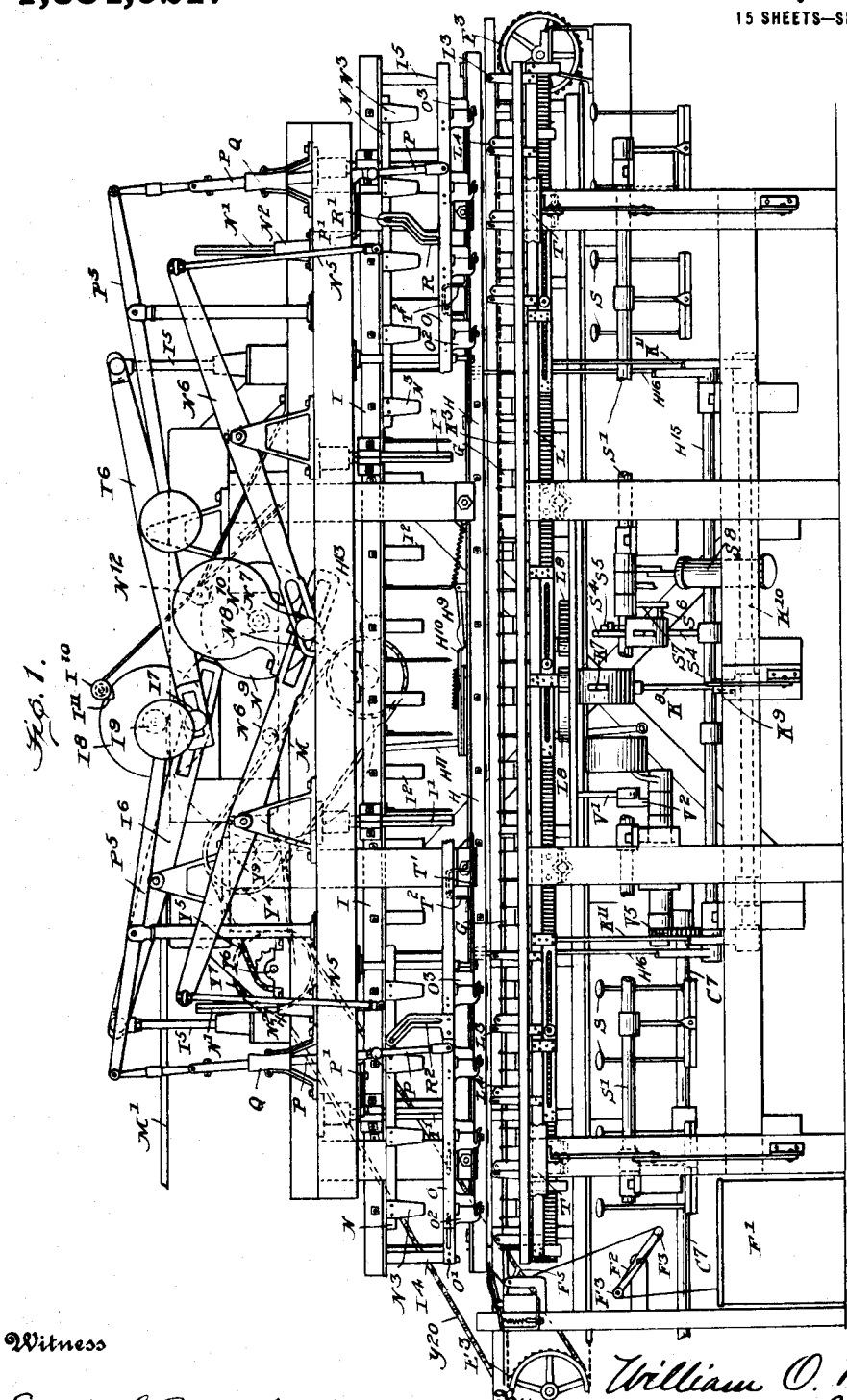

W. O. REW.
MACHINE FOR FORMING AND WRAPPING SMALL PACKAGES OF BUTTER.
APPLICATION FILED FEB. 18, 1920.
1,384,921.
Patented July 19, 1921.
15 SHEETS—SHEET 2.
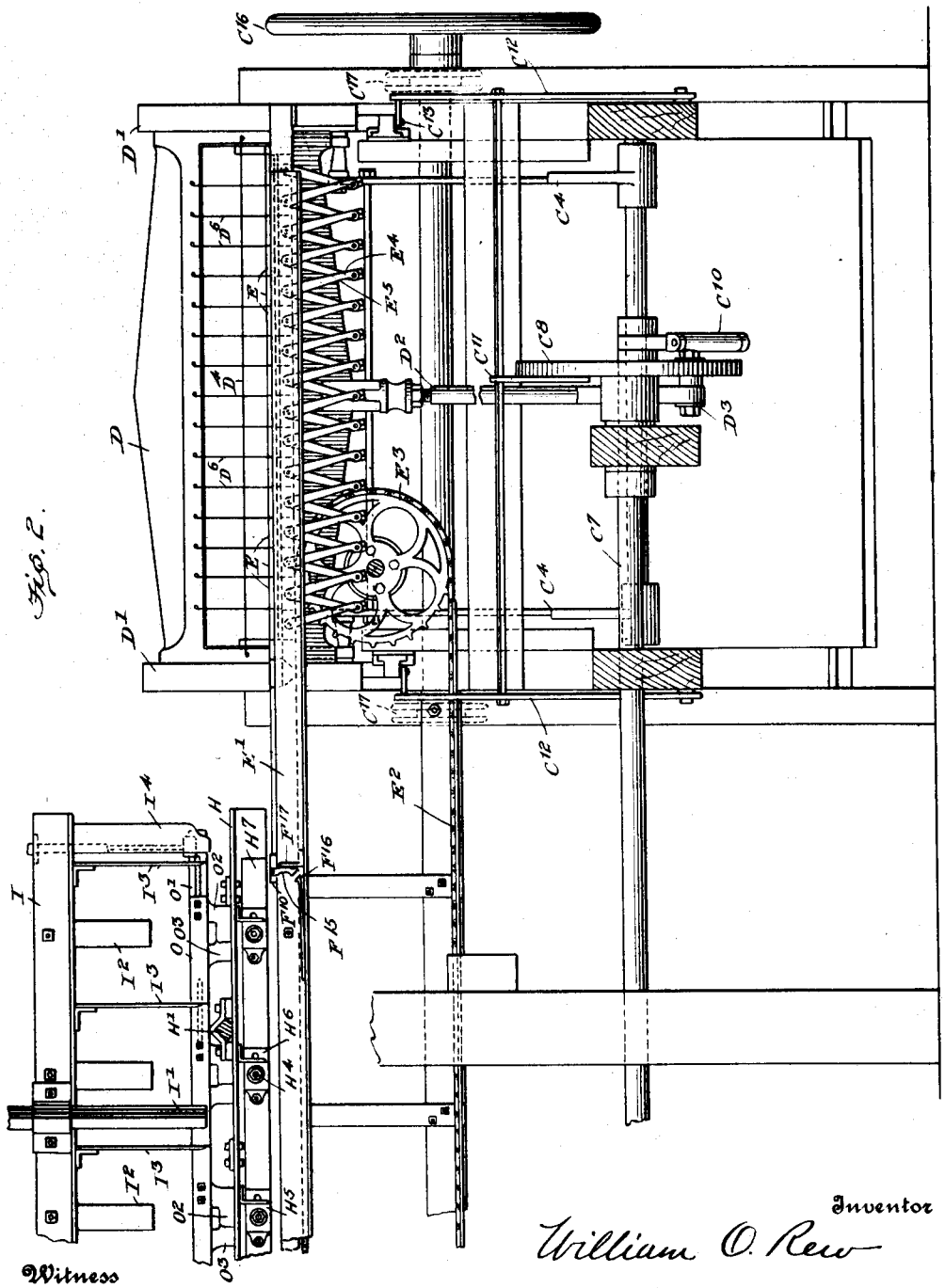

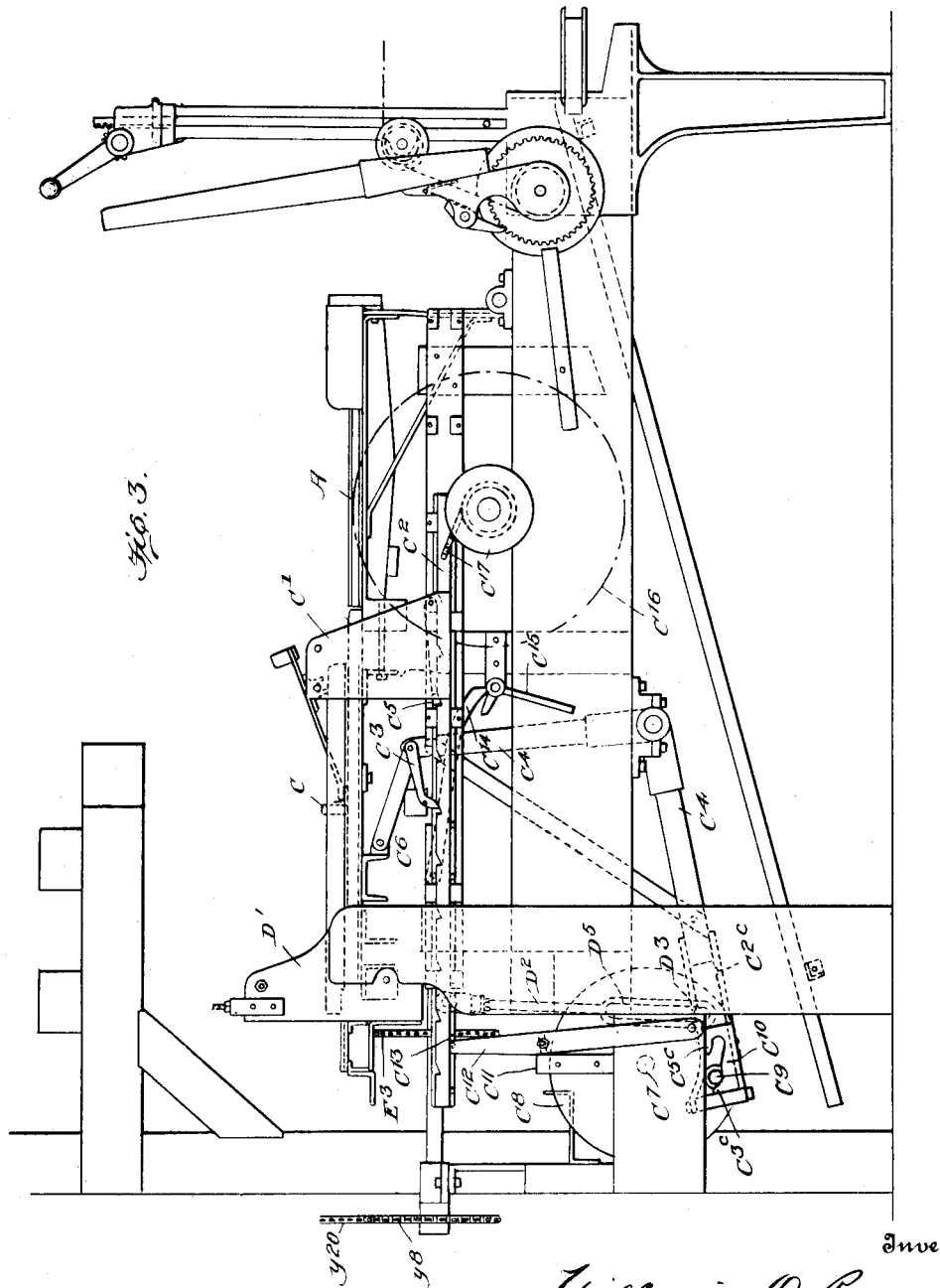

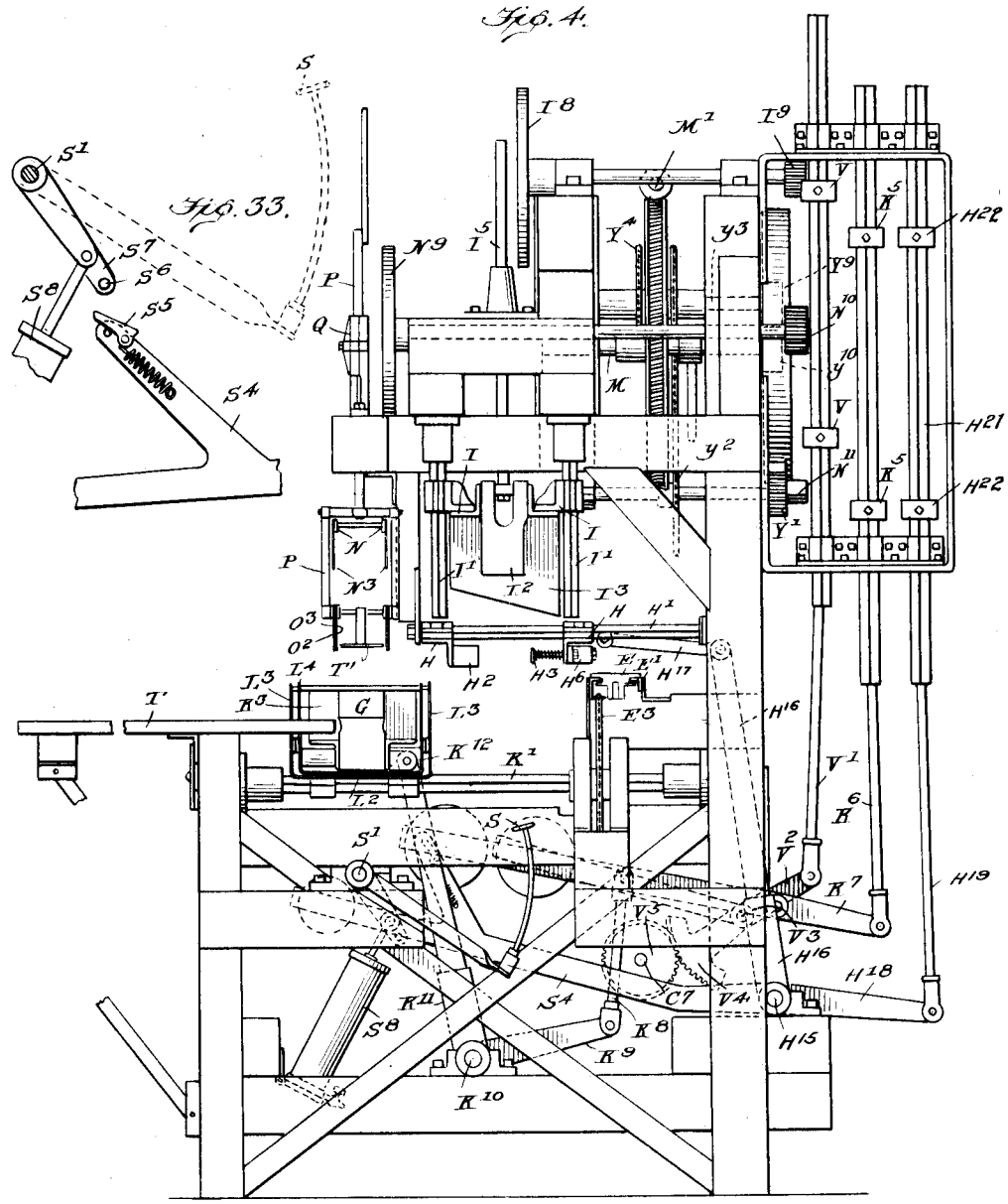

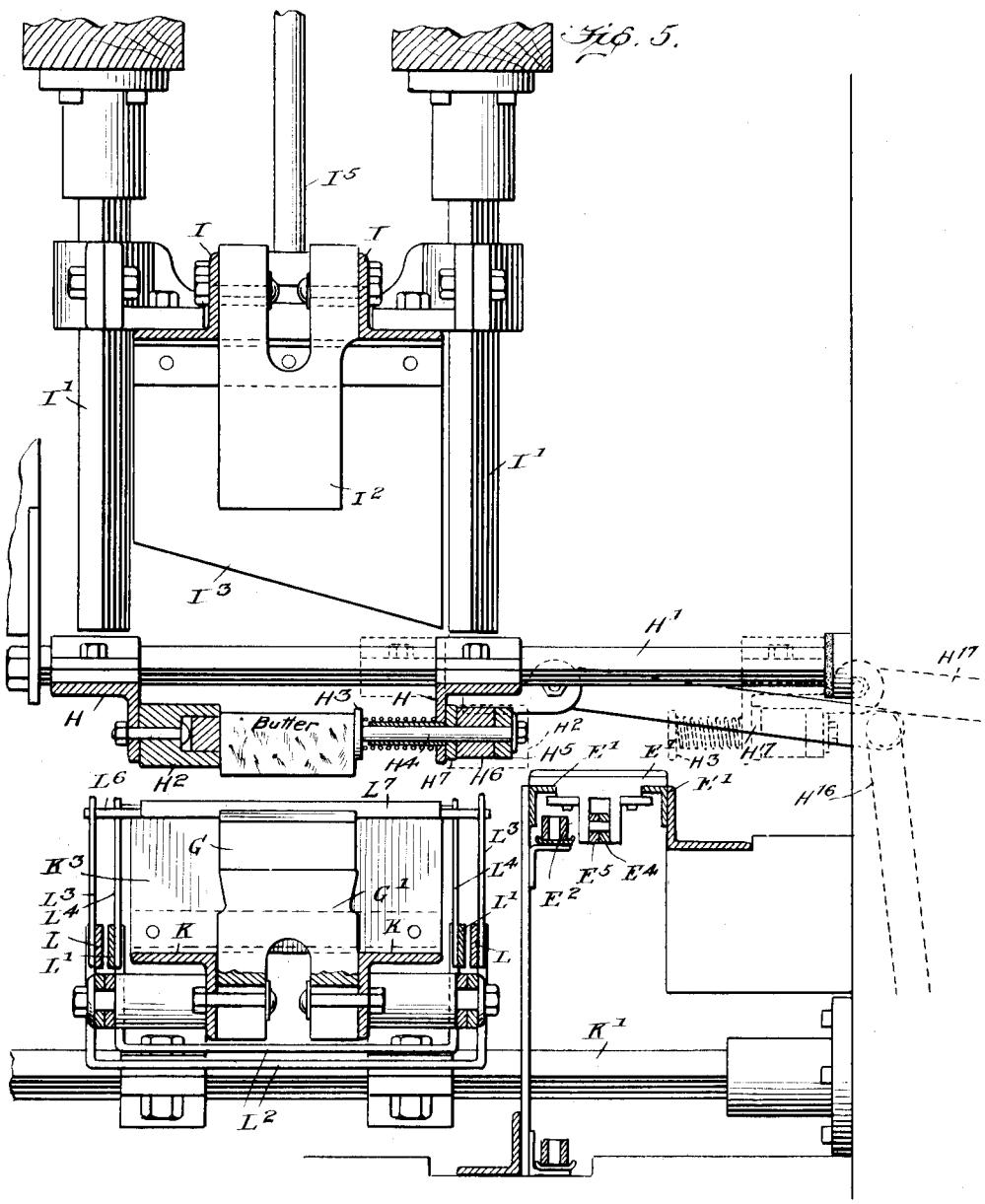

W. O. REW.
MACHINE FOR FORMING AND WRAPPING SMALL PACKAGES OF BUTTER.
APPLICATION FILED FEB. 18, 1920.
1,384,921.
Patented July 19, 1921.
15 SHEETS—SHEET 6.
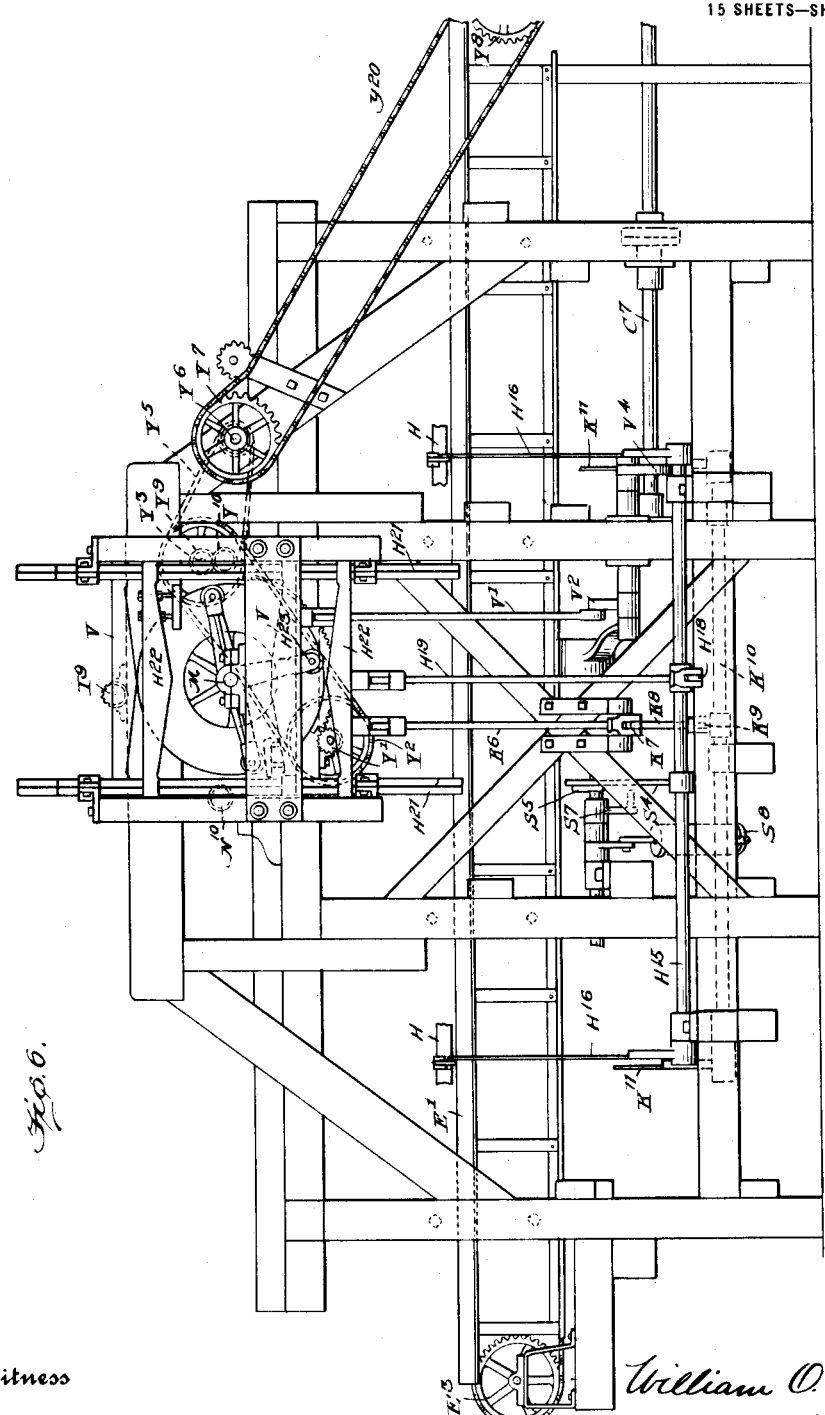

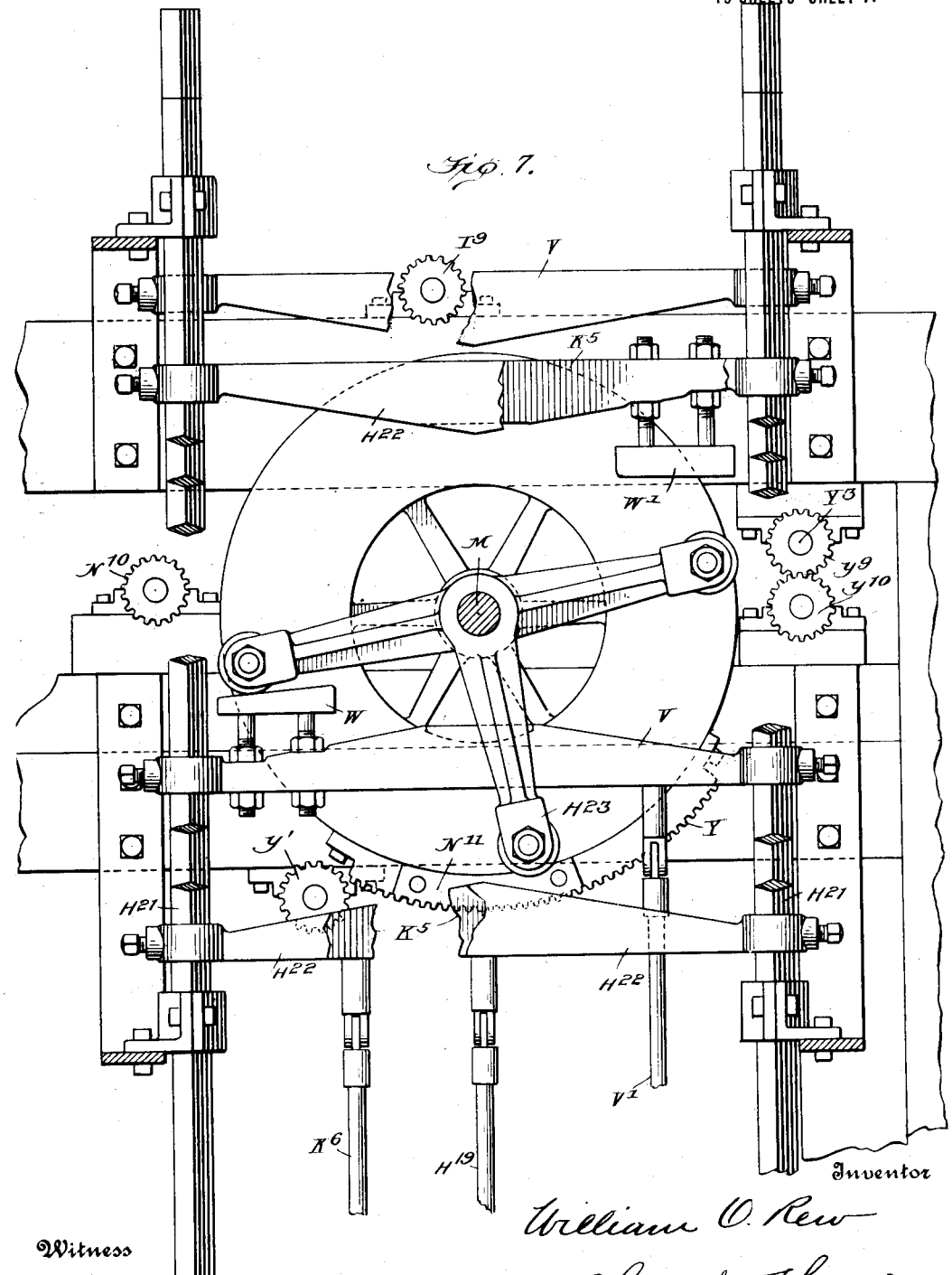

W. O. REW.
MACHINE FOR FORMING AND WRAPPING SMALL PACKAGES OF BUTTER.
APPLICATION FILED FEB. 18, 1920.
1,384,921.
Patented July 19, 1921.
15 SHEETS—SHEET 8.
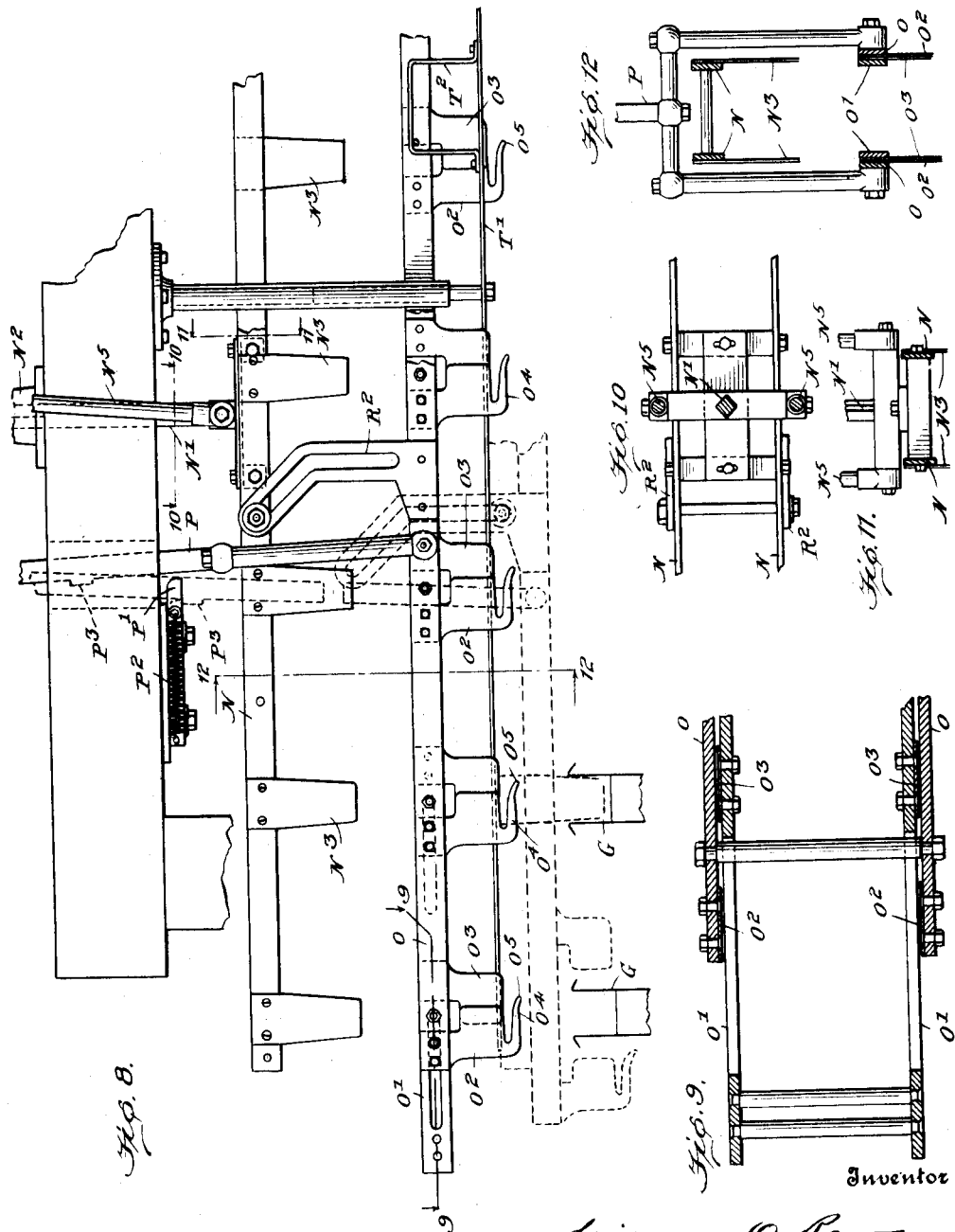

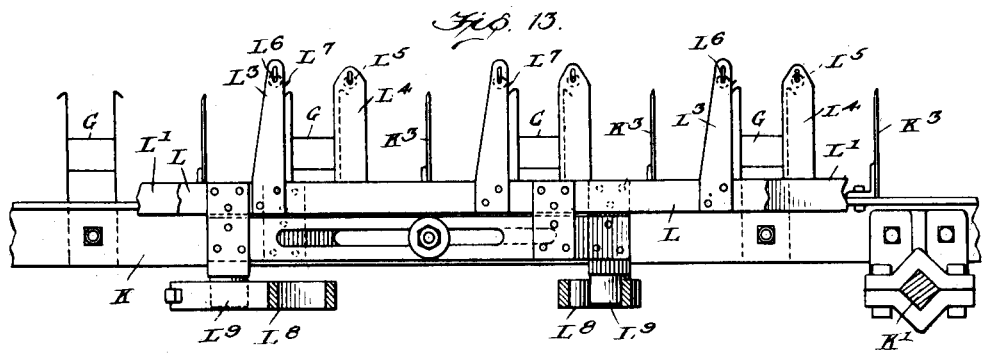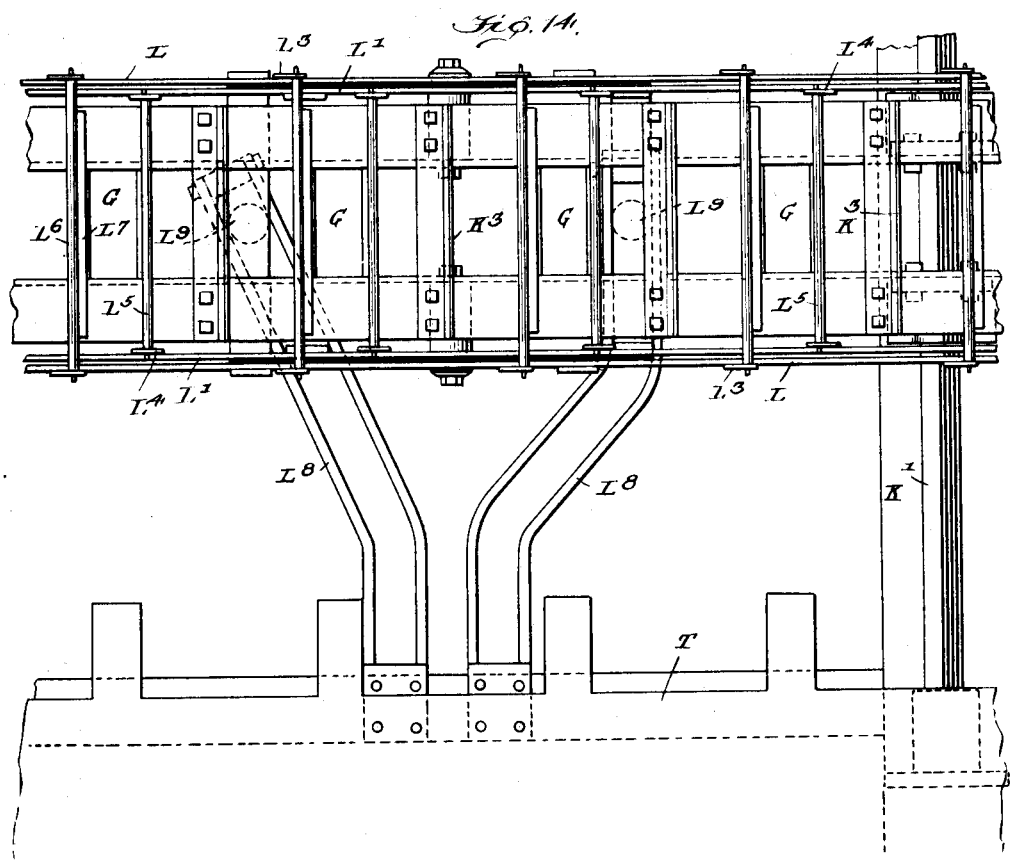

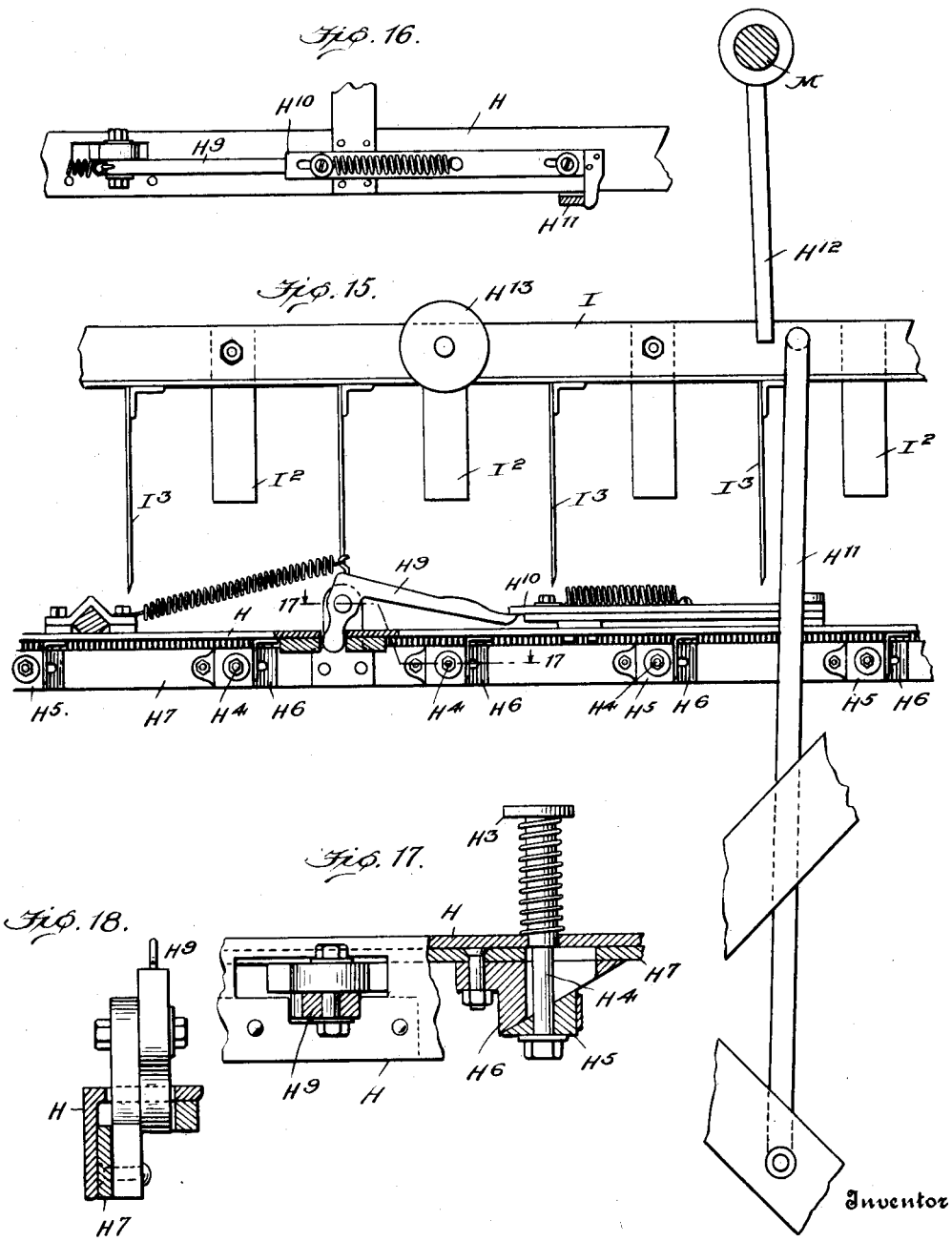

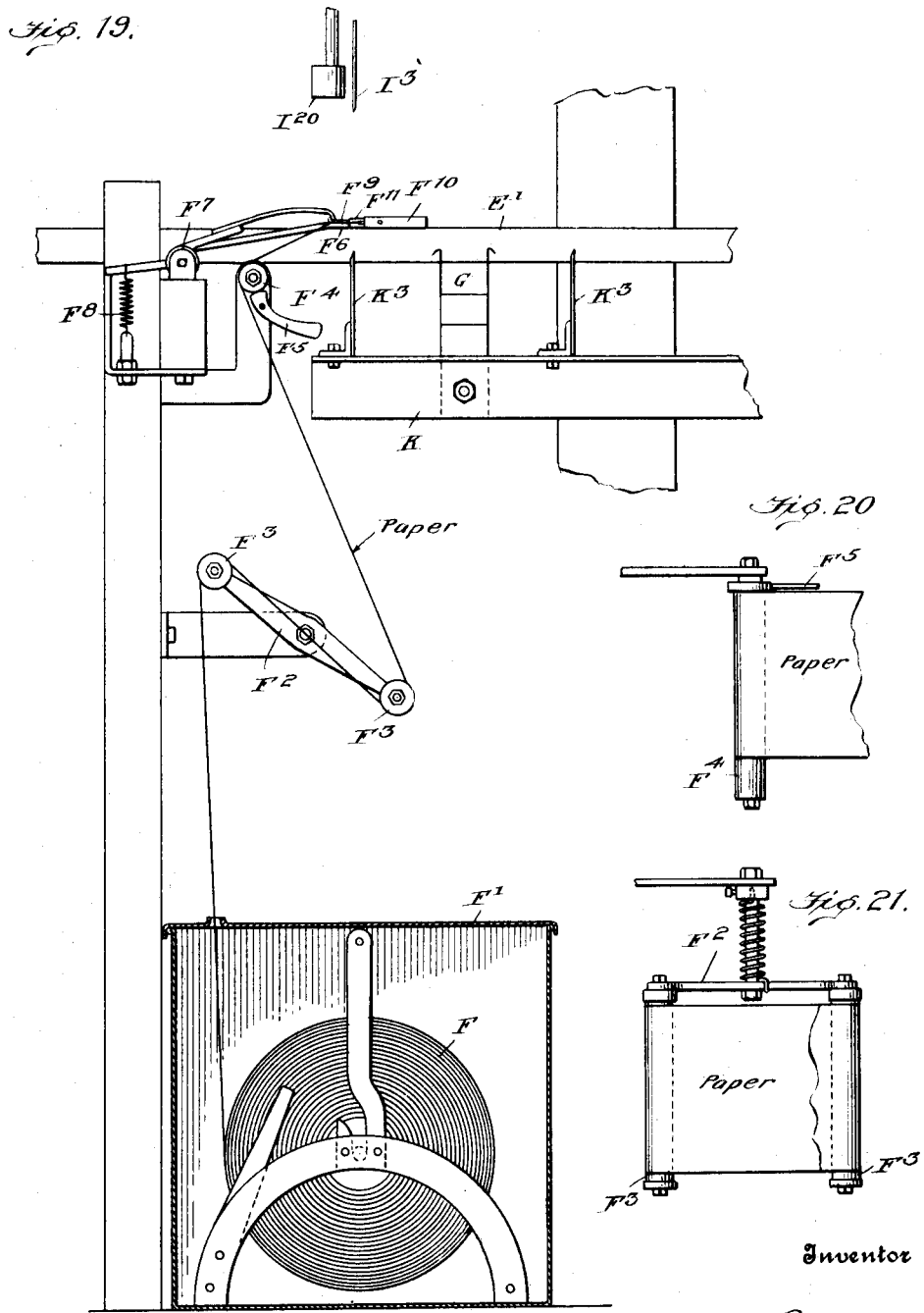

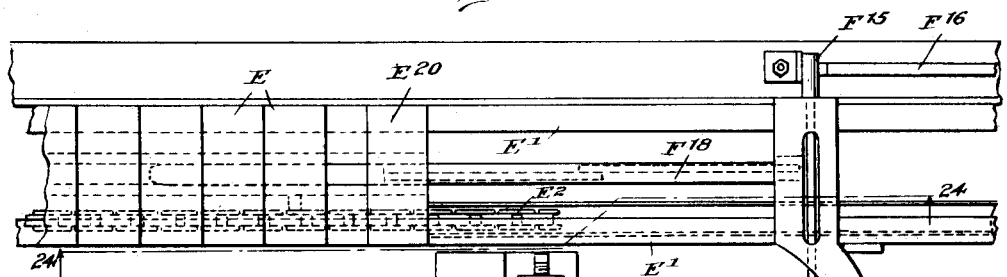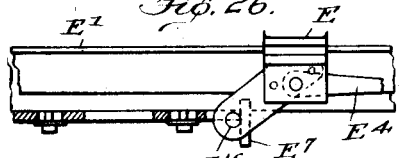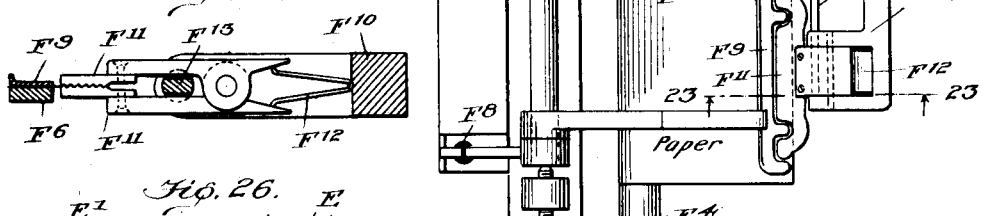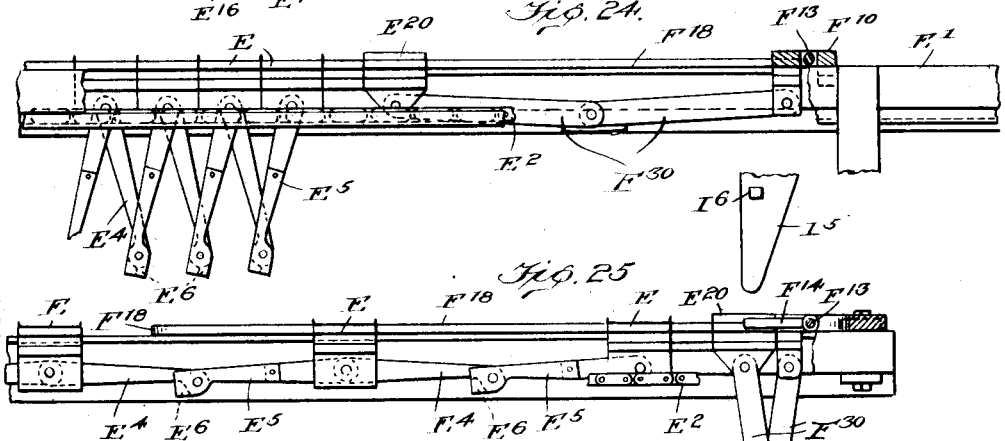

W. O. REW.
MACHINE FOR FORMING AND WRAPPING SMALL PACKAGES OF BUTTER.
APPLICATION FILED FEB. 18, 1920.

1,384,921.

Patented July 19, 1921.
15 SHEETS—SHEET 13.

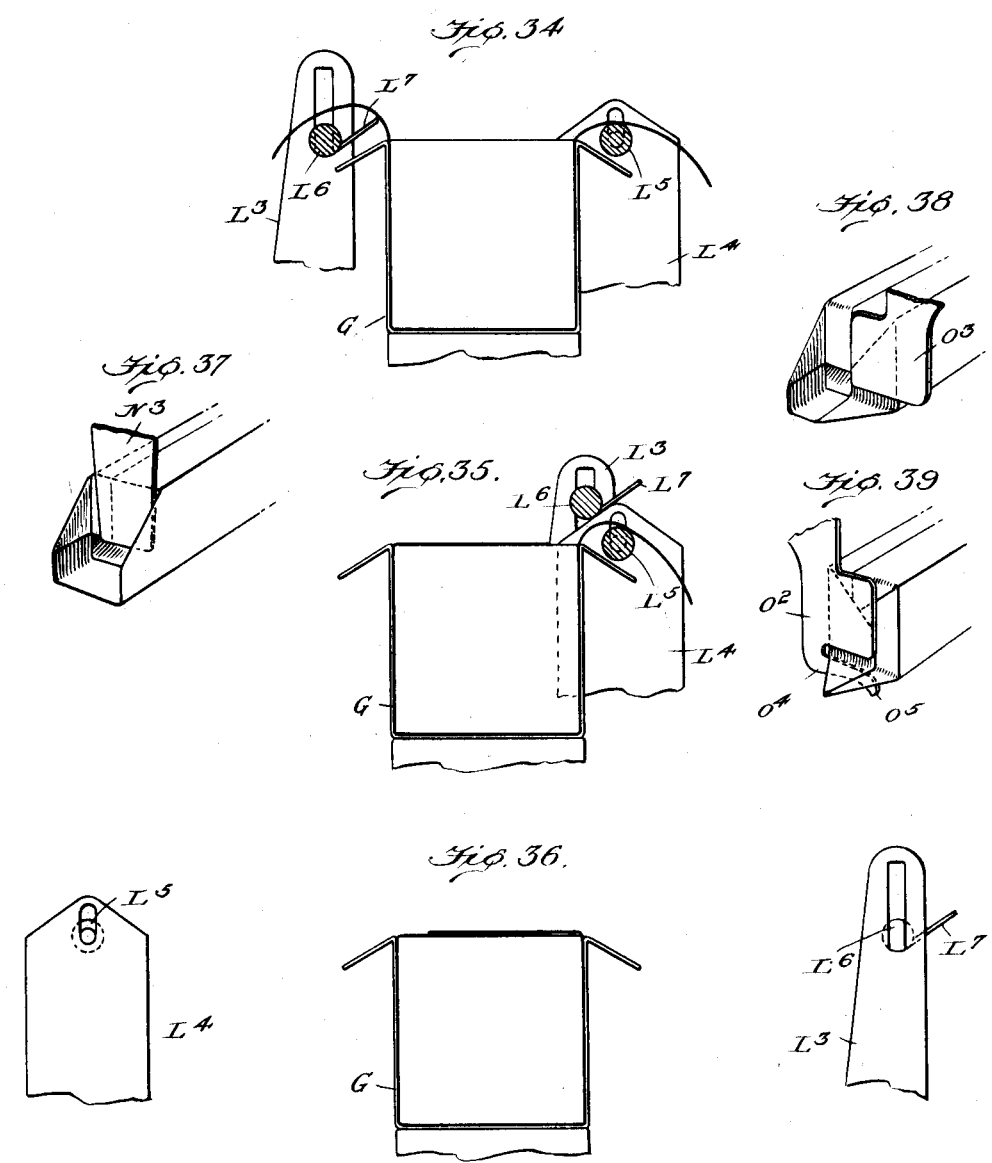

W. O. REW.
MACHINE FOR FORMING AND WRAPPING SMALL PACKAGES OF BUTTER.
APPLICATION FILED FEB. 18, 1920.
1,384,921.
Patented July 19, 1921.
15 SHEETS—SHEET 15.
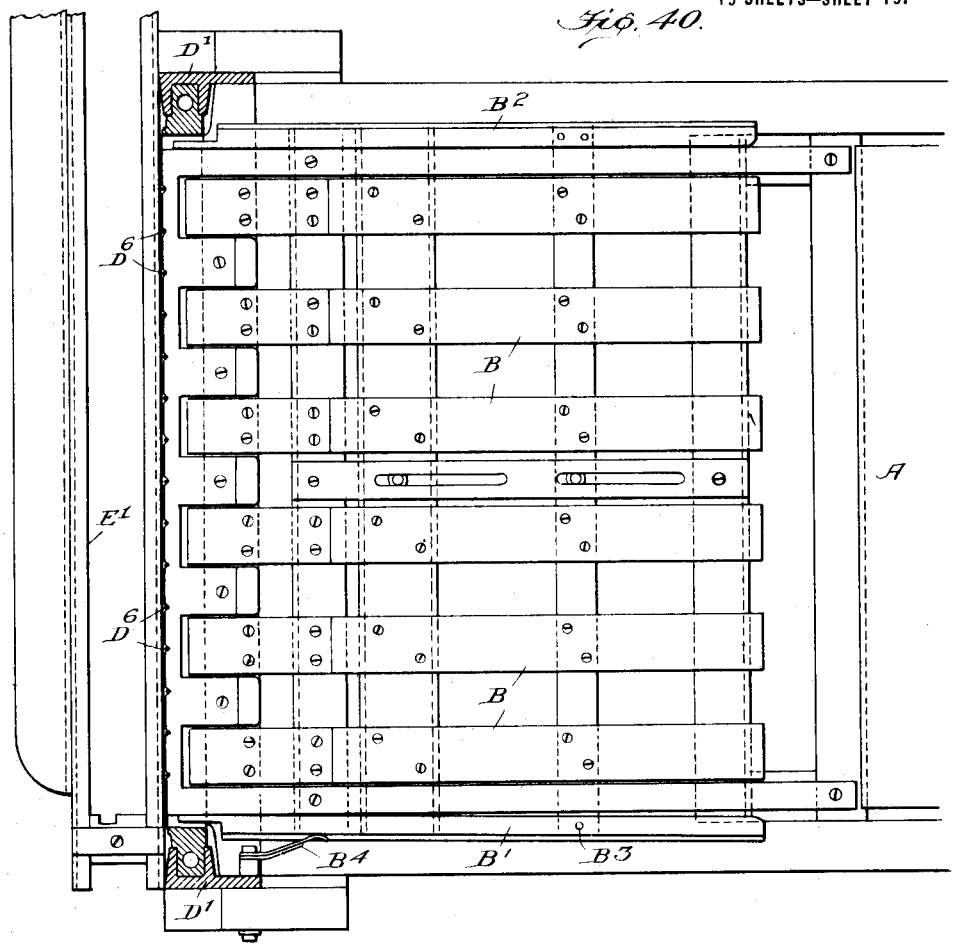
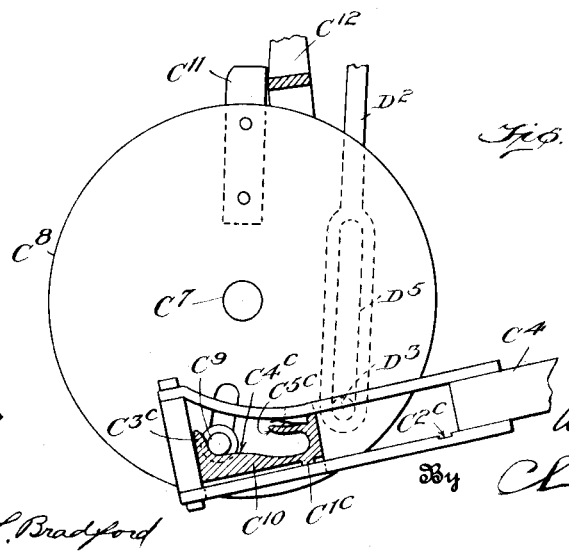
Witness
Edwin L. Bradford
Inventor
William O. Rew
By
his Attorneys

UNITED STATES PATENT OFFICE.

WILLIAM O. REW, OF EUREKA, CALIFORNIA.

MACHINE FOR FORMING AND WRAPPING SMALL PACKAGES OF BUTTER.

1,384,921.  Specification of Letters Patent.  Patented July 19, 1921.

Application filed February 18, 1920. Serial No. 359,630.

*To all whom it may concern:*

Be it known that I, WILLIAM O. REW, a citizen of the United States, residing at Eureka, in the county of Humboldt and State of California, have invented certain new and useful Improvements in Machines for Forming and Wrapping Small Packages of Butter; and I do hereby declare the following to be a full, clear, and exact description of the same, reference being had to the accompanying drawings forming part of this specification.

The present invention relates to package forming and wrapping machines, and more particularly to machines which are adapted to handle material which is in a more or less plastic condition. The object of the invention is to provide a machine which shall be competent to subdivide butter in relatively small sections or portions, such, for example, as quarter pound rectangular sections, which will conveniently pack in rectangular cartons adapted to hold pounds or multiples of pounds, and to wrap each section independently without the necessity of the unwrapped sections being handled by the operatives.

A further object of the invention is to provide a machine which will have a large capacity per unit of time, and to this end it embodies means for simultaneously forming a large number of separate sections and for simultaneously wrapping and ejecting said sections.

A further object of the invention is to provide a machine which will wrap the sections of butter in limp or wet wrappers and without deforming or reducing the weight of the sections in the handling and wrapping operations.

Referring to the accompanying drawings,—

Figure 1 is a front elevation, with parts broken away, of a machine embodying the present invention.

Fig. 2 is a rear elevation with parts broken away and parts omitted, of the portion of the machine at the left hand end as viewed in Fig. 1.

Fig. 3 is an end elevation of the left hand end of the machine and showing the mechanism for feeding the slabs of butter and incidentally a part of a known mechanism for cutting a slab of butter from the large block.

Fig. 4 is an end elevation of the right hand end of the machine.

Fig. 5 is a section in a plane from front to back of the machine and showing the means for transferring one of the butter sections from the conveyer to the wrapping devices.

Fig. 6 is a rear elevation of the main portion of the machine to show the drive mechanism, many of the other parts being omitted.

Fig. 7 is a sectional elevation on an enlarged scale of parts shown in Fig. 6, overlying parts being broken away in places.

Fig. 8 is a detail elevation of a portion of the package end folding mechanism.

Figs. 9, 10, 11 and 12 are sections on lines 9—9; 10—10; 11—11; and 12—12, respectively of Fig. 8, showing details of construction.

Fig. 13 is an elevation partly in section of a part of the mechanism for making the top folds on the package.

Fig. 14 is a plan view of the parts shown in Fig. 13.

Fig. 15 is a detail sectional elevation showing part of the paper cutters and releasing devices for the plungers of the mechanism for transferring the butter sections from the receivers to the pockets for wrapping.

Fig. 16 is a plan view of parts shown in Fig. 15.

Fig. 17 is a detail plan with parts in section substantially on the line 17—17, Fig. 15.

Fig. 18 is a section looking at the left hand end of Fig. 17.

Fig. 19 is a sectional elevation showing the paper controlling and feeding mechanism.

Figs. 20 and 21 are details of the paper-controlling mechanism.

Fig. 22 is a plan view of the paper feeding mechanism and part of the receivers for the sections of butter.

Fig. 23 is a section on the line 23—23, Fig. 22.

Fig. 24 is a section on the line 24—24, Fig. 22.

Fig. 25 is a view corresponding to Fig. 24, but showing the carriers in the extreme right hand end of the ways.

Fig. 26 is a view showing the stop for the last receiver in its movement away from the cutter.

Fig. 27 is a view of the actuating arm and catch for the paper feeding jaws, the point of view being opposite to that of Figs. 19 and 23.

Figure 28:
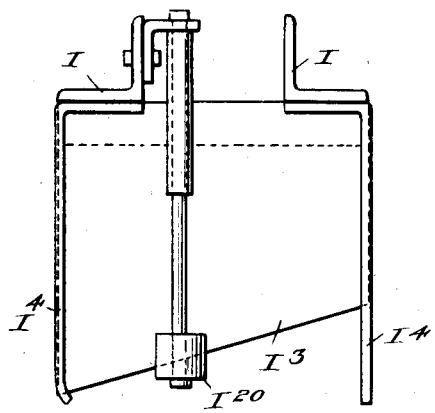
Figure 29:
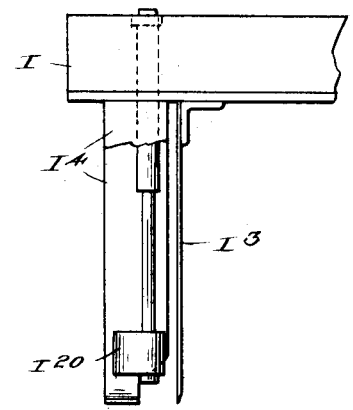

Figs. 28 and 29 are views of the paper severing knife and weight for lowering the paper at the left hand end of the machine.

Figure 30:
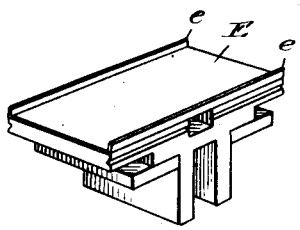

Fig. 30 is a perspective view of one of the butter receivers.

Figure 31:
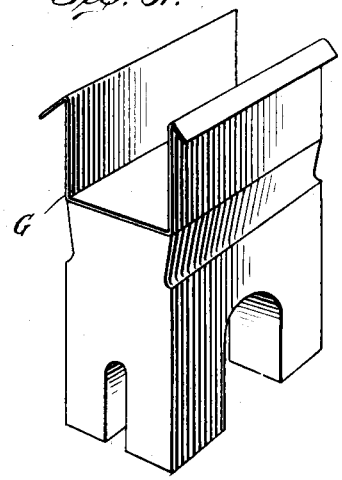

Fig. 31 is a similar view of one of the pockets in which the butter is held while being wrapped.

Figure 32:
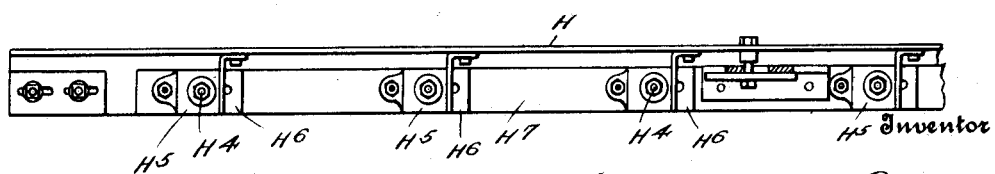

Fig. 32 is a detail elevation showing the left hand end of parts shown in Figs. 2 and 15.

Fig. 33 is a detail of the operating mechanism for the ejectors which discharge the wrapped packages from the pockets.

Figs. 34, 35 and 36 are detail views showing successive steps of the top fold forming devices in wrapping one package.

Figs. 37, 38, and 39 are detail perspective views showing the operation of the successive end fold forming devices.

Fig. 40 is a detail top plan view of the butter slap receiving table and some associated parts.

Fig. 41 is a detail view of a portion of the mechanism shown in Fig. 3 for feeding the slabs of butter through the cutters.

The machine of the present invention, in its broader aspect, contemplates the subdivision of a large mass of butter which is ordinarily formed up in a knock-down press box usually mounted on a truck whereby the mass of butter may be brought into proper operative relation to the machine itself. When the butter in this form arrives at the machine it is usually in a rectangle which may be approximately 19½ x 24 inches in cross section and approximately 54 inches long. With the use of known apparatus this mass of butter is severed into slabs, each of a thickness which substantially corresponds to one dimension of the ultimate packages and as each slab is formed it is turned down into a horizontal position on a tilting table. This tilting table is shown at A (Fig. 3) and when the slab of butter is in horizontal position it is pushed forwardly by the attendant on to a receiving table preferably formed of slats B (Fig. 40), in which position a pusher C is adapted to coöperate with its rear end to advance it intermittently to the cutting mechanism.

The pusher C (Fig. 3) is mounted on a pusher carriage C' adapted to slide on the cutter frame and having connected therewith a rack bar or bars $C^2$ with widely spaced teeth or notches for coöperating with an operating pawl $C^3$ carried by the upper end of a triangular lever $C^4$. There is also a holding pawl $C^5$ mounted on the cutter main frame and the holding ends of the operating and holding pawls are so spaced with relation to the notches or teeth of the racks that when the operating pawl is advanced to its farthest position there is a limited space in front of the holding pawl. The object of this arrangement is to enable the pusher to retreat for a limited distance after each advanced movement, whereby the butter slab is withdrawn slightly from the cutting mechanism, as will be presently explained. There is a link connection $C^6$ between the end of the lever $C^4$ and the feeding carriage or platform B and the range of movement imparted to the feeding carriage or platform equals the distance the slab of butter should be advanced to carry the same through the cutting mechanism far enough to equal the length of the ultimate small sections to be wrapped. In other words the butter is preferably fed through the cutting mechanism at each operation a distance equal to the length of the desired sections, but in order that the slab of butter, after the sections are severed therefrom, may be drawn away from the cutting mechanism a continued movement of the operating devices serves to permit a slight backward movement to the lever $C^4$ thereby drawing the feeding table, platform and slab of butter backwardly, and during this movement the pusher frame is also pushed backwardly to the extent permitted by the holding pawl $C^5$. The mechanism for accomplishing these results is conveniently in the form of an oscillatory shaft $C^7$ carrying a disk $C^8$ having an adjustable crank pin $C^9$ therein. For coöperation therewith a cam slot in one end of the bell crank lever $C^4$ is a convenient construction. The lever is provided with a slide-way for a small carriage $C^{10}$ having a cam-shaped recess therein, in which the crank pin operates. During a portion of the travel of the crank pin it moves over the cam surface of the recess in the carriage $C^{10}$ and during the other portion of its movement the carriage is moved in unison with it. The cam shape of the recess in the carriage $C^{10}$ is such that when the parts are brought to the position shown in the drawing a slight reverse movement will have been permitted the lever and the disk and crank pin have come to rest. In the preferred construction illustrated, the carriage $C^{10}$ is provided with a projection $C^{1c}$ adapted to seat in a recess $C^{2c}$ when the carriage is at the inner end of its travel, whereby the carriage will be held until the crank pin $C^9$ moves over the cam surface $C^{4c}$ and strikes the part $C^{3c}$ of the carriage, whereupon the inner end of the carriage will be lifted sufficiently to disengage the projection $C^{1c}$. The carriage is then moved forwardly by the crank pin to the position shown in Fig. 3. The reverse movement is imparted to the table by a projecting arm $C^{11}$ on the disk which contacts with a lever $C^{12}$ advancing the latter against a projection $C^{13}$ on the rack of the pusher carriage C', and it will be noted that this reverse movement is permitted by the movement of the crank pin over the crest $C^{4c}$ of the cam surface in the carriage $C^{10}$. During the initial part of the return or reverse movement of the crank pin $C^9$, it moves independently of the carriage $C^{10}$ until it contacts with the point $C^{5c}$ of the carriage and finds its seat in the inner end of the carriage, the continued movement serving to move the carriage $C^{10}$ back and finally seats the projection $C^{1c}$ in the recess $C^{2c}$. This return movement of the crank pin exerts practically a continuous lift on the lever $C^4$ and brings the pawls $C^3$ into position to engage the next notches or teeth on the side pieces $C^2$ of the pusher frame.

To permit of bringing the pusher back by hand to position for coöperation with a new slab of butter provision is made for lifting and holding both the operating and retaining pawls out of engaged positions. This may conveniently be a lifter bar $C^{14}$ pivotally mounted on the cutter frame in position to underlie lifting pins on the respective pawls and to be operated by a hand grip $C^{15}$. The attendant may thus throw the pawls out of operation and by the use of a hand wheel $C^{16}$ connected by a chain and drum $C^{17}$, with the pusher carriage, return the latter to its initial position for coöperation with a new slab of butter.

The receiving table (Fig. 40) has two sides, slats $B'$ and $B^2$, arranged on edge to form side guides which keep the slab of material fed to the cutter D square with same. $B^2$ is the guide at the right side of the receiving table and a fixed part thereof, $B'$ is the guide at the left hand side of the receiving table. It is pivoted at point $B^3$ and pushed toward $B^2$ by spring $B^4$ to allow for variation in width of material fed to cutter D, also to keep the material tight against $B^2$ and square with cutter D. Spring $B^4$ is attached to cutter guide frame $D'$.

The cutting mechanism employed embodies a vertically movable frame D mounted to slide in ways $D'$ (Figs. 2 and 3) in the main frame. The frame D is reciprocated through the medium of a connecting rod $D^2$ extending down and joined to a crank pin $D^3$ on the disk $C^8$. The actual cutting is performed by a series of wires stretched across the opening in the frame D, the spacing of the vertical wires being such as to give the proper transverse size to the several sections of butter. In the present machine, which is designed for making quarter pound sections, the wires $D^6$ are spaced apart approximately 1½ inches and this is approximately the thickness of the slab of butter which is to be cut. A transverse wire $D^4$ serves to sever the several sections from the slab of butter and the timing of the machine is such that the frame D is caused to descend and finish its severing movement immediately preceding the retrograde movement of the butter slab, carriage and pusher.

It will be understood that the slab of butter is pushed through the cutting wires by the movement of the pusher and carriage and then the frame D is caused to descend, the necessary lost motion being effected through the medium of a slot connection between the crank pin and connecting rod as shown at $D^5$.

In the preferred arrangement of the cutting and severing wires, and especially the vertical cutting wires, they are made in cross section somewhat wedge-shaped or sharpened on the entering sides, in order to effect a separation of the cut and severed section and to insure the proper placement of the several sections in their respective separating or spacing carriages to be presently described, but obviously other or known forms of cutter may be employed, such, for example, as flat, round or irregular-shaped wires, fiber catgut thread or twine as may be best suited for the material being cut.

When the slab of butter is pushed forwardly through the cutting wires the advancing cut sections pass onto a series of receivers E all mounted to slide laterally of the cutting mechanism on long ways $E'$. These ways extend the full length of the machine, and the receivers E, while they are located close together at the receiving end of the ways, are, through mechanism to be presently described, adapted to be separated one from the other when moved along the ways and to finally reach positions where they are evenly spaced apart the proper distance for competent wrapping mechanism to coöperate with and wrap each section independently. A whole group of small sections of butter is cut at one operation, then separated and simultaneously wrapped at another operation, thus greatly economizing time and enabling a machine of this character to be operated at a speed which is of great commercial advantage.

Each of the receivers E may be smooth or corrugated, but is preferably provided with slightly raised flanges $e$ (Fig. 30) along its edges and between which flanges the small sections of butter pass in the cutting operation. As soon as the cutting frame descends and effects the severing of the sections from the slab the receivers are caused to travel along the ways referred to, and mechanism for accomplishing this movement preferably embodies a long feeding chain $E^2$ traveling over sprocket wheels $E^3$ (Figs. 1 and 2) located at opposite ends of the machine, and mechanism which will be presently described for imparting to this chain movement alternately in opposite directions for distances which correspond to the greatest travel of the end receiver when moving away from and back into position in front of the cutting mechanism. This feeding chain $E^2$ is connected directly with the first one of the receivers which moves away from the cutting mechanism, and by the same token with the last one of the receivers in the line moving toward the cutting mechanism. The receivers are connected with each other through the medium of flexible connections preferably hinged or jointed spacing links $E^4$, $E^5$ between adjacent receivers (Fig. 2) and these links are adapted to substantially straighten out (Fig. 25) when the leading receiver has reached its final position of advance or movement away from the cutting mechanism. The final relative position of the central joint, however, is preferably below the center line at which point further opening movement is arrested by a stop shoulder $E^6$ on one of the links. In this position of the connected series of receivers the first one in the line reaches the end of the guiding ways and the last one in line is provided with a stop pin $E^{16}$ (Fig. 26) adapted to come to rest against a stop shoulder $E^7$ on one of the ways, thus accurately positioning the whole line of receivers and adapting each for coöperation with other mechanism for subsequent manipulation of the butter sections carried by it.

While not limited thereto, the machine contemplates the provision of means whereby the butter will be wrapped in wet parchment paper or wet paper of suitable strength and texture to give the necessary protection and it, therefore, embodies means for feeding paper wet with salt water into position to receive the several sections of butter and of means whereby the paper is severed into appropriate sections corresponding to the number of butter sections. All the sections are wrapped simultaneously and delivered in position to be conveniently handled in further operations.

The paper, which may, if desired, have been previously treated to adapt it for the substance to be wrapped, is usually provided in roll form of proper width to inclose the sections of butter in a lengthwise direction. It is conveniently supplied from a roll F located in a salt water tank F' (Figs. 1 and 19), from which tank it passes up over a slack take-up and evener $F^2$, usually in the form of a pivoted spring-pressed frame having rollers $F^3$ around which reversed loops of the paper pass. The paper also leads over a third roller $F^4$ mounted in fixed bearings, but having a light friction finger $F^5$ bearing thereon. From the roller $F^4$ the paper passes through a clamping guide consisting of a bottom bar $F^6$ (Figs. 19, 22, and 23) forming the forward portion of a frame pivoted at $F^7$ and normally adapted to be held in elevated position by a spring $F^8$. A top bar $F^9$ below which the paper passes is mounted on the bar $F^6$ in such wise as to be readily swung to one side for placing the paper in position and is held against the bottom bar with a little pressure so as to lightly scrape the paper without interfering with its free movement through the guide. The frame consisting of the two bars $F^6$ and $F^9$ is adapted to be depressed under certain circumstances to be presently referred to when the paper feeding devices are brought into position to coöperate therewith.

The paper feeding devices consist essentially of a clamp adapted to grasp the leading end of the paper which projects through between the bars $F^6$ and $F^9$ (Fig. 22) and to draw the same out in accord with the movement of the butter receivers before referred to. The particular form of paper feeding clamp employed embodies a pair of jaws having serrated faces, said jaws being pivotally mounted in a frame $F^{10}$ which is mounted on the ways on which the butter receivers travel and which projects laterally from said ways or toward the front of the machine. The two jaws are indicated at $F^{11}$ (Fig. 23) and it will be noted that they are normally held closed by a flat spring $F^{12}$ and are adapted to be opened by an intermediate cam shaft $F^{13}$ also journaled in the frame $F^{10}$ and projecting through between the jaws. This shaft or carriage $F^{13}$ is provided with an arm $F^{14}$ for coöperating with mechanism for opening the jaws when at the outer extreme of movement and with an arm $F^{15}$ (Fig. 27) for opening the jaws at the inner extreme of movement. The latter arm $F^{15}$ is adapted to coöperate with the spring catch $F^{16}$ (Fig. 27), located on one of the receiver ways. The initial coöperation of the arm with said catch opens the jaws and further movement of the carriage causes the arm to snap past the catch, thereby closing the jaws and permitting the flat spring before referred to to close the same on the projecting end of the paper web. At this instant, the further movement of the carriage along the ways is arrested by a spring stop $F^{17}$, the latter also serving to insure the location of the paper carriage in proper relation to the guide for the paper web to secure effective operation. The carriage $F^{10}$ is connected with a spacing member or block $E^{20}$ by links $F^{30}$. The spacing member is attached to the first one of the receivers which will bring the paper feeding carriage back to its proper position. The spacing member $E^{20}$ between the paper carriage and the first receiver is of proper width to insure the movement of the paper carriage in advance of the first receiver a distance which will bring the end of the paper to the proper point for providing the necessary overlap in wrapping the section of butter carried by the first receiver. The carriage $F^{10}$ coöperates with the paper web at some distance to one side of the guides on which it travels (Fig. 22) and in order to prevent locking by twisting, the said carriage is preferably provided with a fairly long stem $F^{18}$ which is guided in openings or slots in the intermediate spacing block $E^{20}$, and some of the first of the butter receivers. The length of the stem is made sufficient to hold the carriage true in its guide-ways.

When the paper web is drawn out in unison with the movement of the butter receivers it lies immediately over a series of pockets which are positioned in fore and aft alinement with the positions to which the sections of butter are carried by the receivers, and the machine embodies means whereby the sections of butter will be transferred from the receivers into positions over the web of paper and over the aforesaid pockets, together with means whereby the sections of butter will be forced down into the pockets carrying with them each its proper portion of the web of paper so that by subsequent manipulation each may be inclosed in its individual wrapper. Provision is made, of course, for severing the web of paper into separate sheets at this time or at the moment when the sections of butter are just about to enter the respective pockets. The pockets are indicated on the drawings by G (Figs. 1, 4, 5, 8 and 31 to 36), and each preferably consists of a pair of upwardly projecting, slightly yielding sides, but with no end walls. Each pocket is conveniently formed of sheet metal and is firmly placed in position on a pedestal projecting upwardly from a pocket and wrapping carriage to be presently described. For transferring the sections of butter from the receivers to a position over the pockets or pocket carriage a transfer carriage is provided. This transfer carriage extends the full length of the main portion of the machine and is conveniently formed with angle iron side pieces H (Figs. 1, 2, 4 and 5) held in rigid relation by suitable connecting straps and mounted to slide from front to back of the machine or transversely with relation to the receiver ways on suitable guiding supports H' mounted in the main frame of the machine. A sufficient number of supports H' are provided to insure a proper parallel movement of the transfer frame and to hold the same with sufficient rigidity to give accurate results. Between the angle iron side members of the transfer frame mechanism is provided for clamping the respective sections of butter after the latter have arrived at their separated positions. An arrangement which has been found effective in practice embodies a series of blocks or abutments $H^2$ (Fig. 5), preferably made of wood and mounted on the transfer frame in position to normally lie just on one side of the path of travel of the sections of butter carried by the receivers. These blocks may be conveniently termed clamping abutments and for coöperation therewith there are a series of movable clamping abutments. The latter are conveniently in the form of face plates $H^3$ mounted on stems $H^4$ working longitudinally in bearings in the angle iron side of the transfer frame opposite the relatively fixed abutments $H^2$. The movable abutments $H^3$ are held advanced by springs surrounding the stems and they are adapted to be retracted by coöperating inclines, one surrounding the stems on the outer side of the transfer frame adapted to control the longitudinal movement of the stem and the other mounted on a long bar and adapted by a longitudinal movement of the bar parallel to the transfer frame to retract the movable abutments or to permit them to advance under the influence of their springs. As shown in the embodiment of the invention illustrated (Figs. 15 and 16) the wedge-shaped inclines supported by but movable with respect to the stems are indicated by $H^5$, while the coöperating inclines are indicated at $H^6$. The latter are all mounted on a long bar $H^7$ slotted for the passage of the stems therethrough and this bar $H^7$ is adapted to be operated in proper time to retract all of the abutments when the receivers are advancing along their ways to position the sections of butter between the abutments and to release the movable abutments at the time when the several sections of butter have been positioned so that each section will have been clamped between a relatively fixed and movable abutment. The arrangement is preferably such that the long operating bar for the movable abutments shall not rest upon or interfere with the movement of the abutment stems, inasmuch as it is highly desirable that these parts shall operate with great certainty and without danger of balling up the butter being operated on.

The pressure of the springs on the stems of the movable abutments, of course, tends to hold the operating bar advanced in one direction. In order, now, to move that bar in the opposite direction so as to liberate the movable abutments to clamp the butter, a bell crank lever $H^9$ (Figs. 15 and 16) is pivotally mounted on the transfer frame conveniently at a central point, and one arm of this lever coöperates with a slot in the abutment operating bar. The opposite end of the bell crank lever is adapted to coöperate with a sliding latch $H^{10}$ mounted on the transfer frame whereby it will be held in position to retract the abutments. The latch or catch $H^{10}$ is adapted to be released at a proper moment or when the sections of butter have been positioned through the medium of a release lever $H^{11}$ pivoted at the lower end of the main frame of the machine and at the upper end projecting into position to be struck by an arm $H^{12}$ projecting from the main shaft M of the machine. The bell crank lever H⁹ is restored to its position after being released from the catch by a roller or projection H¹³ which is mounted on a vertically movable plunger and paper cutting frame to be hereinafter referred to.

The sections of butter having been positioned between the abutments on the transfer frame when in the position shown in dotted lines, Fig. 5, and in the cycle of operations of the machine, the movable abutments having been released and the butter grasped between the abutments, the next effective movement is to transfer the sections of butter toward the front of the machine to the position shown in full lines. In this movement the sections of butter are caused to slide endwise of the receivers and they are carried forwardly to a position immediately over the paper web which latter, it will be remembered, was advanced in unison with the movement of the receivers and occupies a position parallel with the ways on which the receivers travel. With the sections of butter in this position, mechanism is provided whereby they will be pushed down into a series of pockets G, one for each section of butter, and as the butter comes in contact with the paper web the latter is severed into a series of sheets by means of suitable knives located intermediate the pockets and thereafter the wrapping or folding mechanism comes into play to first make the top folds, one after the other, and then to make the end folds simultaneously at opposite ends of the butter sections. It may be noted that at the instant when the sections of butter come into engagement with the paper and upper edges of the pockets G the movable abutments in the transfer frame are all retracted so as to completely release the sections of butter, this being effected as before stated through the operation of the roller or projection H¹³ on the lever H⁹.

An effective and convenient arrangement of mechanism for performing these several operations embodies a vertically movable plunger and cutter carrying frame I mounted to slide on rigid and preferably rectangular vertical guides I' depending from the main frame of the machine and adapted to be reciprocated vertically in proper time through the medium of driving mechanism to be presently described. This plunger and cutter frame I carries a series of plungers I², one for each butter section and pocket and between each adjacent pair of plungers there is a web cutting knife blade I³ (Figs. 1, 2, 4, 5 and 15).

The pockets G before referred to are mounted on pedestals G', the latter in turn being carried by a pocket frame K. The pocket frame K is adapted to slide back and forth from front to rear of the machine on horizontal guides K' located in the main frame at suitable intervals in its length and provision is made for moving this pocket frame in proper time to receive the sections of butter when in its rear position and to bring the sections of butter toward the front of the machine where the wrapping or folding operations are completed. The pocket frame carries a series of knives or web cutters k³ for coöperation with the cutters I³ and it will be understood that inasmuch as the plunger frame and pocket frame are movable, one in a vertical direction, and the other in a horizontal direction, the guide ways should be sufficiently numerous and sufficiently rigid to insure the proper coöperation of the web cutting knives at the time when the pocket frame is in its rear position. At this time, namely, when the butter is being deposited in the pockets and the plunger frame is descending, it will be noted that the transfer frame is in position between the plunger frame and pocket frame and therefore the plungers and knives on the plunger frame are adapted to work down through the transfer frame and provision is preferably made whereby the frames will be accurately centered with relation to each other. This provision is conveniently in the form of guides on the plunger frame indicated at I⁴ at the left hand end of the machine and at I⁵ at the right hand end of the machine (Figs. 1, 2, 28 and 29). One of the guides I⁵ carries a pin I⁶ which coöperates with the arm F¹⁴ on the paper carriage shaft (Fig. 25), whereby the end of the paper web is released when the plunger frame descends.

The paper guide F⁶ is normally held up by its spring F⁸, thus suspending the paper above the knives as it is drawn out, but as the knife frame descends a gravitating weight I²⁰ comes in contact with the guide to swing it down to a point where the paper will rest on or be just above the cutting edges of the lower knives.

The mechanism for forming the top folds or folding the paper over the top of the sections of butter after the latter are pushed down into the pockets is preferably mounted on the pocket carriage to move from front to rear in unison therewith and vice versa, but having an independent movement lengthwise of the machine in order to effect the top folding operations. This independent movement is preferably made to occur during the travel of the pocket frame from its receiving position into its end fold forming and discharging position. The top folding mechanism embodies in the machine illustrated a pair of frames mounted to slide longitudinally on the pocket frame, which sliding frames embody long side bars L, L', (Figs. 5, 13 and 14), similar bars on opposite sides of the pocket frame being connected together by tie pieces L² extending under the pocket frame. The respective side bars L and L' carry standards L³ and L⁴ respectively and in the upper ends of these standards there are loosely mounted folding members preferably in the form of a roller L⁵ (Figs. 13, 14, 34 and 35), in the standard L⁴, and a bar L⁶ in the standards L³, the bars being provided with wing-like lateral projections L⁷. In operation the folder frames are reciprocated in opposite directions longitudinally of the pocket frame, the rollers L⁵ being adapted to pass under the bars L⁶, the two elements crossing each other, but one in advance of the other across the top of the pockets, thereby wiping first one fold of the paper down over the butter and then the other fold of the paper down over the first fold. The movement of the folder frames is such that they advance to effect the folding operation during the forward movement of the pocket frame and return to their initial position during the rearward movement of the pocket frame and after the butter sections have been discharged from the pockets. The mechanism for effecting these movements of the folder frames is conveniently a pair of fixed guide ways or cam slots L⁸ L⁸ (Figs. 13 and 14) mounted on the main frame of the machine central of and immediately below the pocket frame and adapted to coöperate with the rollers L⁹ L⁹ mounted respectively on the folder frames. The cam or incline slots or guides L⁸ L⁸ are so shaped as to impart a leading movement to the bars L⁶ whereby the latter will start to make a fold of the paper over the top of the butter wiping this fold down against the butter where it will adhere by reason of the moisture and limpness of the paper and this is immediately followed by the advance of the rollers L⁵ to wipe the second fold of the paper over the first fold and the second fold is also caused to adhere or lie down smoothly on the sections of butter by reason of its limpness and moisture. The result is that the cam slots or guide way L⁸ and L⁸ may be given any desired shape to secure the proper sequence of movements and in order that there may be no conflict or interference of the rollers and bars with each other the upper ends of the standards L⁴ are preferably inclined as shown to form lifting guide ways for the bars L⁶ as the latter pass over the rollers in both directions of movement.

At the time when the pocket frame reaches its forward extreme of movement the top folds of the butter have been completed and the sections of butter with the partly folded wrappers are brought into position for coöperation with the end folding devices. These end folding devices are adapted to make, first, a top end fold, secondly, side ends folds, and finally, the usual bottom end folds. The folds are made simultaneously at opposite ends of the packages or sections of butter and a convenient and entirely practical mechanism for making these end folds with extremely limp and wet paper is as follows:

For making the top end folds a vertically movable frame N is mounted on the lower ends of sliding guides N' working through guide ways N² in the main frame (Fig. 1) and depending from this frame N are a series of pairs of downwardly extending first fold forming blades N³ (Figs. 8, 10, 12 and 37). These blades N³ are so positioned that they will pass down at opposite ends of each butter section pushing the first top fold down smoothly against such ends.

The mechanism for folding the side and bottom folds at the ends of the packages embodies a pair of vertically movable frames located below the frame N and adapted to have a vertical movement partly in unison with the frame N and partly independently thereof, but in addition they are adapted to have an endwise movement for making the side end folds. These two frames or pair of frames are conveniently formed of side bars O, O' (Figs. 8 and 9) arranged in pairs and connecting together by transverse braces, the transverse braces for the outer bars O extending through slots in the inner bars O' whereby independent or opposite longitudinal movement may take place. The blades for forming the side end folds depend from the bars O, O' respectively, and these blades conveniently embody oppositely facing wiping edges or projections O² O³, the blades forming the wiping projections O² in addition being provided with a hook-shaped projection O⁴ lying parallel therewith but with an outwardly curved end O⁵. This hook-like projection is adapted to pass under that portion of the end of the wrapper which is to form the final end closing flap and by an upward wiping action to fold the same flat against the end, thereby completing the package.

In the preferred arrangement the blades N³ are adapted to pass down between and be guided by the side bars O, O' of the second end folder frame and mechanism is provided for moving the members of this second folder frame both horizontally and vertically.

Conveniently the said folder frame members are hung on swinging supports P passing upwardly through guides Q in the form of friction clamps or members preferably exerting sufficient pressure to normally hold the frames in vertical position to which they may be adjusted and at the same time allowing of the necessary longitudinal movements either simultaneously or independently. The supports P may of course be connected with one only of the pair of said bars O, O', the other pair of side bars or frame O, O' being supported from the first inasmuch as their vertical movements are in unison but independent longitudinal movement must be permitted.

For imparting the necessary longitudinal movement the side bars or frame O' is adapted to carry an upwardly extending pair of slotted guides or guides having cam slots therein indicated at R (Fig. 1) and working in the slots of these guides are a pair of rollers or a guide pin R' mounted on the frame N. Obviously, as the frame N descends in a vertical line the frame O' will receive a lateral movement during that period of time in which relative vertical movement of the two frames occurs.

A similar arrangement is provided between the side bars or frame O and the frame N but in this instance the shape of the guide $R^2$ (Figs. 1 and 8) is such as to impart a longitudinal movement to the frame or side bar O at a different time from the longitudinal movement imparted to the frame O'.

The several movements are effected through the drive gearing to be presently described and are timed to occur substantially as follows: starting with the first end fold forming frame N in its highest position and beginning to descend, the frame O carrying the final end fold frame hooks is moved to the left and immediately after it has reached the left hand end of its movement the frame O is moved to the right. These movements occur before the frames begin to descend as a unit and the parts have been brought into position to coöperate with the paper. With the blades all in this position, the final downward movement is effected thereby forming the first end fold through the instrumentality of the blades $N^3$. When the frames have all reached this lowermost position, the next movement should withdraw the first fold forming blades $N^3$, but leaving the other blades ready to form the remaining folds. In order to insure the retention of the last named blades down in proper position an automatic locking device is preferably provided for coöperation with the sliding members P. This device, one of which is located in association with each support, is a small sliding catch P' (Figs. 1 and 8) mounted on the main frame and adapted to be held advanced a definite distance by a spring $P^2$ and when so advanced it is adapted to engage a projection $P^3$ on the support P as the latter starts to ascend. The disengagement of the catch is effected by the lateral swing of the support after the second end folds are made or are partly made.

When the blades $N^3$ have moved upwardly a sufficient distance to completely clear the ends of the packages the transverse movement of the side blades begins to occur, that is to say, the vertical movement of the frame N has then reached a point where the cam slot in the guide R begins to be effective for moving the blades $O^3$ forward. Immediately upon the completion of the forward movement of the blades $O^3$ the blades $O^2$ begin their forward movement through the coöperation of the guide $R^2$ with the rollers on the frame N. As the last of these two movements is completed the rollers have reached the upper ends of the slots in the guides R and $R^2$ and simultaneous upward movement of all of the end folder frames begins to occur. At this time the hooks $O^4$ are under the final end flaps and a direct upward movement of the frames will cause the final end flaps to be wiped up over the ends of the packages completing the same. It is to be noted that the final movement of the frame O toward the right releases the support from the catch P' and the frames are therefore free to rise. The final upward movement of the end folder frame leaves the packages of butter all wrapped and ready for discharge. For effecting the discharge of the packages, a series of pushers S (Figs. 1 and 4) are mounted on an oscillatory shaft S' journaled in the main frame below the level of the pocket frame and by imparting movement to these pushers at the proper instant all of the packages will be shoved forwardly out of the pockets and on to a receiving table T. For accessibility and convenience this table is hinged at its rear edge so as to turn down when desired and it is notched at the rear edge to provide spaces for standards of the top folding devices.

Inasmuch as under some circumstances there is a tendency for the butter packages to lift out of the pockets at the time when the final end folds are made a gravitating holder is provided. This gravitating holder is located between the end fold forming blades and is suspended from the end fold former blade frames. It is conveniently in the form of a long flat bar or presser member T' adapted to be supported by yokes $T^2$ passing loosely over cross pins in the frames O, O'. This gravitating member it will be seen lies on or over the top folds of the wrappers during the entire time that the end folds are being formed thereby holding the sections of butter in position with a sufficient pressure to insure the desired results, but without exerting sufficient pressure to deform the packages. It is lifted off of the packages by the upward movement of the folder frame prior to the advance of the pushers for discharging the packages.

Obviously the driving mechanism for imparting the necessary movements to the several parts may be of any desired type and the timing may be effected through known arrangements. As illustrated in the drawings, however, a worm wheel driven main shaft M is provided. The worm for driving the worm wheel is conveniently located on a belt driven counter shaft M' (Figs. 1 and 4). Motion is taken from the main shaft through the intermediary of cam arms for operating the transfer and pocket carriages as well as for operating the pushers, but for imparting the vertical movements to the plunger and end folding devices or carriages, motion is imparted through pinions and gear segments, the latter carried by the main frame. The movements necessary for advancing and retracting the butter section receivers and paper carriage are preferably through pinions with which gear segments carried by the main shaft coöperates at proper intervals.

To reduce strain and as far as possible to eliminate loss of power through movements requiring a lifting action, counter weights are universally employed throughout the machine, thus the guiding supports for the end folder frames before referred to are at their upper ends connected with counterbalance levers $P^5$. The first end fold former frame N is connected by links $N^5$ with the outer ends of levers $N^6$ which at their inner ends are connected together through the medium of a slot and pin connection $N^7$, a counterbalance weight being provided on the inner end of one of the levers. Motion is imparted to the latter levers through a crank pin $N^8$ in a disk $N^9$ on a shaft carrying a pinion $N^{10}$ (Figs. 1 and 7) with which a short gear segment $N^{11}$ on drive shaft M is adapted to mesh. Each operation of the shaft carrying the pinion $N^{10}$ and crank pin $N^8$ is a complete revolution, the length of the gear segment being proportioned to effect this result and in order that the shaft may be held in its position of rest the disk $N^9$ is provided with a notch or recess for the reception of a spring-pressed roller $N^{12}$, Fig. 1.

The plunger and cutter frame I is carried by vertically moving and guided supports $I^5$ connected at the upper ends with levers $I^6$, the latter being connected at their inner ends by a pin and slot connection $I^7$ and operated through the slotted crank connection with a pin mounted in a disk $I^8$ on a shaft adapted to be intermittently rotated through the medium of a pinion $I^9$ (Fig. 7) also adapted to mesh with the gear segment $N^{11}$ before referred to. This shaft and disk $I^8$ is also adapted to make a single revolution at each operation and it is held in its position of rest by means of a spring-pressed roller $I^{10}$ adapted to seat in a notch or recess $I^{11}$ in the disk $I^8$. The levers $I^6$ may, of course, be provided with special counterbalance weights to offset the load imposed by the weight of the plunger frame on the driving mechanism, such counterbalance weights, however, being omitted from the illustration to prevent confusion.

The back and forth reciprocatory movements are imparted to the transfer frame from an oscillatory shaft $H^{15}$ (Figs. 1, 4 and 6) having arms $H^{16}$ connected by links $H^{17}$ (Fig. 4) with the transfer frame H and also having an arm $H^{18}$ connected by a link $H^{19}$ with a cross head frame (Fig. 6). This cross head frame, like two others to be presently described, embodies two vertical guiding members $H^{21}$ and cross pieces $H^{22}$ connecting them. The cross pieces $H^{22}$ are adapted for coöperation with a cam arm $H^{23}$ on the shaft M whereby the cross head frame is moved up or down as the case may be and an oscillatory motion imparted to the shaft $H^{15}$. In addition to operating the transfer frame this shaft $H^{15}$ operates the pushers for discharging the butter from the pockets and for this purpose it is provided with a forwardly projecting arm $S^4$ provided with a pivoted operating member $S^5$ (Fig. 33) which is spring-pressed in one direction and adapted to coöperate with a flat sided pin $S^6$ on an operating arm $S^7$ of the shaft $S'$ on which the pushers are mounted. In operation the arm $S^4$ swings downwardly until the operating member $S^5$ snaps past the pin $S^6$ and on reverse or upward movement it carries such pin with it, thereby operating the pushers. The pin escapes from the operating device $S^5$ at the moment when the pushers have reached their forward extreme of movement and said pushers then drop back by gravity to their initial position. The return movement is checked by a dashpot $S^8$.

A second and almost identical cross head frame serves to operate the pocket carriage forwardly and backwardly. This cross head frame is indicated at $K^5$ and is connected by link $K^6$ with the outer end of a lever $K^7$ (Fig. 4) pivoted on the main frame and connected by a link $K^8$ with a bell crank arm $K^9$ on shaft $K^{10}$. The other bell crank arm of the shaft $K^{10}$ indicated at $K^{11}$ projects upwardly and is connected with the pocket carriage by slot and pin connections at $K^{12}$. A third cross head frame V is provided for operating the butter cutting apparatus at the left end of the machine and some parts associated therewith. This frame V is connected by a connecting rod V' with an arm $V^2$ on a shaft $V^3$ carrying a gear segment $V^4$ meshing with a pinion or gear wheel $V^5$ on the shaft $C^7$ before referred to. The oscillation of the gear segment imparts the necessary oscillation of the shaft $C^7$ as first hereinabove described.

The several cam arms for operating the three cross-head frames $H^{20}$ $K^5$ and V respectively are all mounted on the main shaft M and are positioned at proper angles around the shaft to effect the necessary movements at the proper time intervals. In connection with the cross head frames V and K⁵ it has been found desirable to employ adjustable contact pieces W and W' in order to get the proper timing and range of movement.

For operating the drive chain E² which in its reciprocation feeds the paper carriage and butter receivers back and forth there is a long gear segment Y on the shaft M which is adapted to mesh at proper intervals with one or the other of two sets of pinions for giving the reverse movements desired. One of these pinions, that marked Y' (Figs. 6 and 7) is mounted on a shaft journaled on the main frame and through a sprocket chain and wheel Y² drives an intermediate shaft Y³. This intermediate shaft Y³ carries a second sprocket wheel Y⁴ (Figs. 4 and 6) in gear through sprocket chain Y⁵ with a sprocket wheel on a second intermediate shaft Y⁶. This second intermediate shaft carries another sprocket wheel Y⁷ in gear through a long sprocket chain Y²⁰ with a sprocket wheel Y⁸ on the shaft carrying the end sprocket wheel E³ for the drive chain nearest the butter cutting mechanism. The first intermediate shaft Y³ carries on one end a pinion Y⁹ in mesh with a similar pinion Y¹⁰ journaled in bearings on the main frame and in position to mesh with the gear segment Y. The position of the pinions Y' and Y¹⁰ in relation to the gear segment Y on the drive shaft M is such that the gear segment comes into mesh with them respectively in proper timed relation to advance the butter receivers and separate them immediately after the butter sections have been severed from the main slab of butter and to return the receivers to position to receive the next sections delivered by the cutting mechanism.

What is claimed is:

1. A plastic material package forming machine embodying means for dividing a plastic material into a plurality of uniform sections, means for uniformly separating the several sections from each other, and means for simultaneously wrapping the several separated sections.

2. A plastic material package forming machine embodying means for simultaneously forming a series of sections of plastic material, means for separating said sections one from the other, and means for simultaneously wrapping and delivering said separated sections from the machine.

3. A plastic material package forming machine embodying means for simultaneously forming a series of sections of plastic material, means having a differential movement for separating said formed sections one from the other, and means for simultaneously wrapping and feeding all of the separated sections uniformly.

4. A plastic material package-forming machine embodying a series of corresponding wrapper folding appliances, drive mechanism common to all of them whereby simultaneous movements are effected throughout the series, mechanism having a differential movement to distribute sections of material to the wrapping appliances, and means for delivering sections of plastic material to the distributing mechanism.

5. A wrapped butter package forming machine embodying means for forming sections of butter of the desired size, wrapping appliances for applying a wrapper around the sections, conveying mechanism for feeding the sections from the section forming to the wrapping appliances embodying a conveyer and transfer mechanism for simultaneously transferring a series of sections from the conveyer to the wrapping appliances.

6. A plastic material package forming and wrapping machine embodying a series of simultaneously operating wrapper applying and folding devices, means for forming a series of sections of material to be wrapped separately and a conveyer embodying a series of carriers, and means for advancing the carriers different distances to separate the sections and present them in position for coöperation with the wrapper applying and folding devices.

7. A plastic material package forming and wrapping machine embodying a cutter having a series of cutting instrumentalities for severing a plastic mass to form a series of sections of uniform size, a conveyer embodying a series of receivers for the severed sections, connections between the receivers permitting of uniform separation in moving from the receiving to the delivering positions, a transfer mechanism for simultaneously removing the sections from the receivers, and wrapper applying and folding devices to which the sections are delivered.

8. A plastic material package forming and wrapping machine embodying a paper strip feeding mechanism, a series of simultaneously movable cutters for severing the fed strip into a series of sections, mechanism for simultaneously locating a section of plastic material over each section of paper, and means for simultaneously folding the sections of paper around the sections of plastic material.

9. A plastic material package forming and wrapping machine embodying a paper strip feeding mechanism, a series of pockets over which said strip is fed, cutters intermediate the pockets for severing the strip into sections, means for simultaneously forcing a section of plastic material into each pocket and partly folding a section of paper around the same, and means for simultaneously completing the folding and wrapping of the paper around all of the sections of material.

10. A plastic material package forming and wrapping machine embodying a paper strip feeding mechanism, means for severing said paper strip into a plurality of sections, a conveyer for advancing a series of sections of plastic material in spaced relation to said severed sections of paper, said paper feeding mechanism being movable parallel with the sections of plastic material advanced by the conveyer, and means for simultaneously folding the sections of paper partly around the sections of plastic material.

11. A plastic material package forming and wrapping machine embodying a conveyer for advancing a series of sections of plastic material in spaced relation, a paper strip feeding mechanism movable parallel with and below the level of the series of sections of plastic material, means for simultaneously severing the strip into sections and partially folding the sections of paper around the sections of plastic material, a series of pockets for the partially wrapped sections, and means for forming the top and end folds of the paper while the sections are held in such pockets.

12. A plastic material package forming and wrapping machine embodying a conveyer for advancing a series of sections of plastic material in spaced relation, a paper strip feeding mechanism movable parallel with the series of sections of plastic material, means for transferring the sections of material to a position over the paper strip, a series of receiving pockets below the paper strip, and means for simultaneously severing the strip into sections and forcing the sections of material and sections of paper down into the pockets for partially folding the paper around the sections.

13. A plastic material package forming and wrapping machine embodying a conveyer for advancing a series of sections of plastic material in uniform spaced relation, a paper strip feeding mechanism movable parallel with the series of sections of material, a transfer mechanism having abutments between which the sections of material are advanced, and means for operating said abutments to clamp the sections of material and for transferring said abutments laterally to a position over the paper strip and for severing said strip into sections one for each section of material to be wrapped.

14. A plastic material package forming and wrapping machine embodying a series of wrapping devices, a conveyer for simultaneously advancing a series of sections of plastic material in spaced relation corresponding to the location of the wrapping devices, a transfer carriage for transferring the sections of material from the conveyer to the wrapping devices embodying a series of relatively movable abutments between which the material is moved by the conveyer, and means for moving said abutments relatively to grasp the sections of material preliminary to the movement of the transfer carriage.

15. A plastic material package forming and wrapping machine embodying a series of wrapping devices, a conveyer for advancing a series of sections of plastic material in spaced relation corresponding to the relation of the wrapping devices, and a transfer carriage embodying a series of normally separated abutments between which the material is advanced by the conveyer, means for closing said abutments on the sections of material and for moving the carriage laterally to convey the sections of material to the wrapping devices, and means for opening said abutments to release the sections of material for the application of the wrappers.

16. A plastic material package forming and wrapping machine embodying means for uniformly spacing the series of sections of material to be wrapped, a series of pockets for receiving said sections of material and wrappers to be folded about the same, means for moving said pockets simultaneously toward the front of the machine, folders coöperating with the wrappers to form the top folds during the forward movement of the pockets, and a series of simultaneously operating end folding devices for coöperation with the wrappers while the pockets are in their forward position.

17. A plastic material package forming and wrapping machine, embodying a carriage having a series of pockets therein for the reception of sections of material, said carriage being movable from its receiving position to its discharging position, means for transferring a series of sections of plastic material to the pockets while the carriage is in its receiving position, and means for forming the end folds of the wrappers while the carriage is in its discharging position.

18. A plastic material package forming and wrapping machine embodying a carriage movable from receiving to discharging position toward the front of the machine, and embodying a series of spaced material receiving pockets, top folders movable with said carriage from receiving to discharging position, and means for effecting their folding movements during the travel of the carriage, and vertically movable end folding devices guided in position to coöperate with the wrappers while the carriage is in its discharging position.

19. A plastic material package forming and wrapping machine embodying a conveyer having receivers therein for sections of plastic material with means for separating said receivers to bring the sections of material into spaced relation, a transfer carriage movable over said conveyer and embodying relatively movable abutments for grasping and transferring the sections of material from the conveyer, a pocket carriage movable below the discharging position of the transfer carriage and embodying a series of receiving pockets, a paper feed for advancing the wrappers above the pocket carriage, plungers for depressing the sections of material into the pockets, and means for forming top and end folds of the wrappers about the sections of material.

20. A plastic material package forming and wrapping machine embodying means for advancing a series of sections of material to be wrapped in spaced relation, a horizontally movable pocket carriage, a horizontally movable transfer carriage for transferring the spaced sections of material into position to enter the pockets of the pocket carriage, a paper strip feeding mechanism for advancing the wrapping strip over the pocket carriage and beneath the transfer carriage, a series of vertically movable cutters, and a series of plungers movable in unison therewith for depressing the sections of material into the pockets of the pocket carriage and simultaneously severing the strip into individual wrappers, and means for forming the top and end folds of the wrappers while the sections of material are held in the pockets of the pocket carriage.

21. In a plastic material package forming and wrapping machine, the combination with a series of pockets for receiving sections of material and wrappers for inclosing the same, and means for placing the sections of material and wrappers within the pockets, of top folders for each pocket movable past each other over the top of the pockets, a vertically movable end folder frame, a series of end folders movably mounted on said frame longitudinally of the series of pockets, and means for retaining the packages of material within the pockets during the vertical withdrawal of the end folder frame.

22. In a plastic material package forming and wrapping machine, the combination with a receiving pocket for a section of plastic material and a wrapper to be folded about the same, of top folders movable over said pocket and end folders embodying horizontally movable blades for forming the side end folds, one of said blades having a final end fold finger movable beneath the final end fold, and means for moving said blade and finger vertically to turn the final end fold up against the end of the package.

23. In a plastic material package forming and wrapping machine, the combination with a pocket for receiving a section of material and a wrapper to be folded about the same, means for forming the top fold, a vertically movable blade for forming the first end fold, horizontally movable blades for forming the side end folds, and a final end fold forming finger movable with one of said side end fold forming blades to a position beneath the final end fold, and means for moving said blade and finger vertically to wipe the final end fold up against the end of the package.

24. In a plastic material package forming and wrapping machine, the combination with a pocket for receiving a section of material and a wrapper for inclosing the same, of top fold forming devices embodying members movable horizontally across the top of the pocket, one in advance of the other, said members being movable vertically with relation to each other, whereby one may travel over the other and the two members assume positions on opposite sides of the pocket during each folding movement and also during each reverse movement.

25. In a plastic material package forming and wrapping machine, the combination with a paper feed mechanism embodying paper strip guiding devices and drawing devices whereby a considerable length of limp paper may be advanced for coöperation with cutting and folding devices, a series of pockets over which said strip is advanced, a series of cutters intermediate said pockets for severing the strip into individual wrappers, and means for depositing sections of material to be wrapped on said wrappers and depressing said sections and wrappers into the pockets, together with means for forming the top and end folds while the sections of material are held within the pockets.

26. A plastic material package forming and wrapping machine embodying longitudinal guideways and upper and lower guideways arranged at substantially right angles thereto, a series of receivers mounted on said longitudinal guideways with flexible connections between said receivers, whereby they are caused to assume a spaced relation, a transfer carriage mounted on the upper guideways and adapted to transfer sections of material from the receivers to a position at one side of the longitudinal guideways, a pocket carriage mounted on the lower transverse guideways and adapted to move into position to receive said sections of material from the transfer carriage, and a vertically movable frame embodying end fold forming devices beneath which the pocket carriage is adapted to move, and means for coördinating the operation of said parts whereby sections of material moved into spaced relation by the receivers will be transferred to the pocket carriage and moved by the pocket carriage into position for coöperation with the end fold forming devices, and means whereby the wrapped portions are discharged from the pockets.

27. A plastic material package forming machine embodying means for dividing a body of plastic material into a plurality of juxtaposed uniform sections, means for separating said sections, and means for wrapping said sections.

WILLIAM O. REW.